United States Patent [19]
Schneider

[11] 3,884,048
[45] May 20, 1975

[54] AIR CONDITIONING EVAPORATOR MODULAR SUPPORT AND LOWERING MEANS

[75] Inventor: Marvin L. Schneider, Peoria, Ill.

[73] Assignee: Caterpillar Tractor Co., Peoria, Ill.

[22] Filed: July 15, 1974

[21] Appl. No.: 488,742

[52] U.S. Cl. .................. 62/298; 62/448; 62/450
[51] Int. Cl. .................................... F25d 19/00
[58] Field of Search ........ 62/77, 298, 448, DIG. 16, 62/449, 450

[56] References Cited
UNITED STATES PATENTS

| | | | |
|---|---|---|---|
| 2,112,277 | 3/1938 | Euiver | 98/33 |
| 2,247,028 | 6/1941 | Kuntz | 62/261 |
| 2,296,725 | 9/1942 | McEwan | 62/259 |
| 3,031,862 | 5/1962 | Sherron | 62/449 |

*Primary Examiner*—William J. Wye
*Attorney, Agent, or Firm*—Phillips, Moore, Weissenberger, Lempio & Strabala

[57] ABSTRACT

A vehicle air conditioning system is provided with a pivotal mounting assembly for a modular unit of the air conditioning system so that the unit may be secured in its normal operating position and may be pivoted away from that normal position for servicing. The pivotal mounting assembly includes a first stationary mounting member secured to the cab of the vehicle and a second mounting member pivotally secured to the first member and supporting the conditioner unit. A screw-type jack is provided for pivoting the unit between its normal operating position and the servicing position.

8 Claims, 5 Drawing Figures

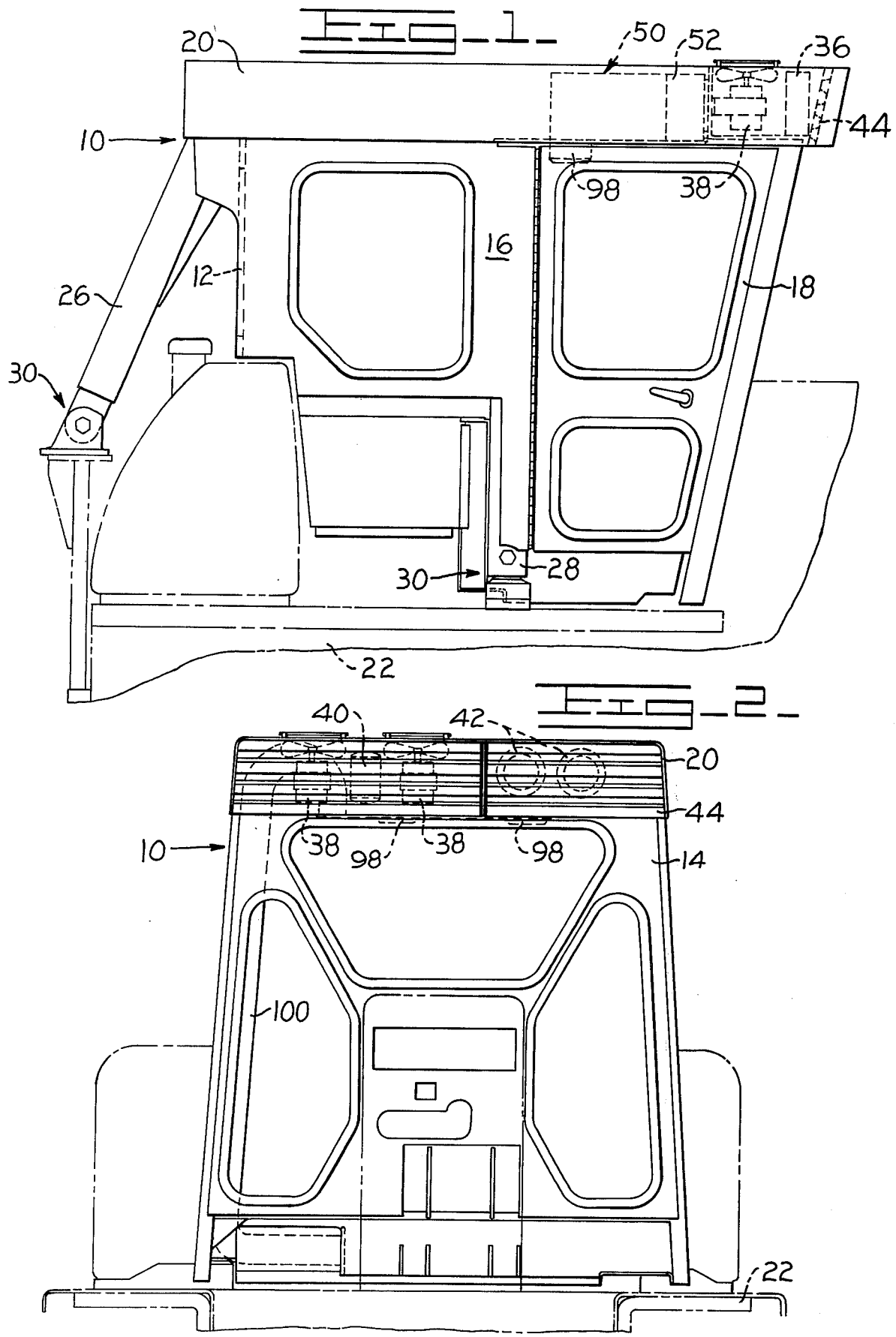

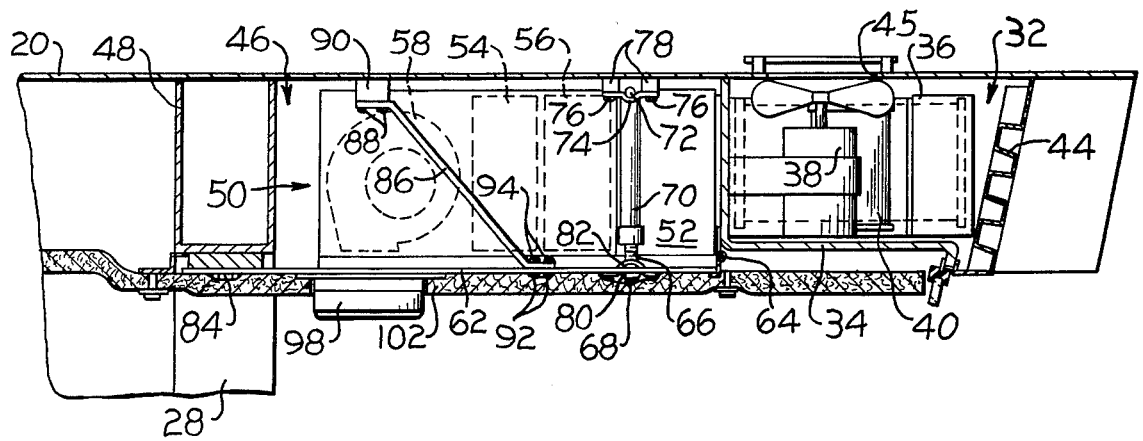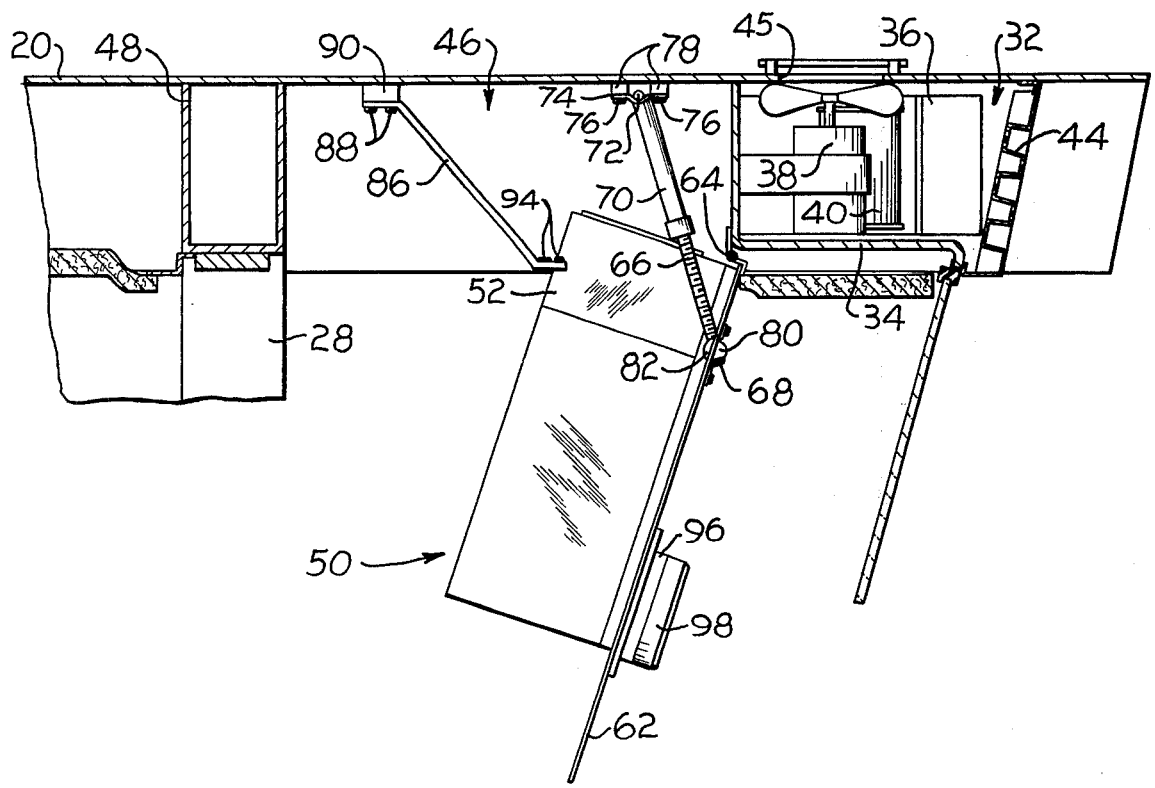

3,884,048

AIR CONDITIONING EVAPORATOR MODULAR SUPPORT AND LOWERING MEANS

BACKGROUND OF THE INVENTION

The present invention relates to mounting means for a module of a modular air conditioning system and pertains particularly to pivotal mounting means for supporting the conditioner unit to the roof of an enclosed operator compartment.

There has been recently devised a modular environmental conditioning system for vehicles which is disclosed and claimed in U.S. application Ser. No. 479,169 filed June 13, 1974 and assigned to the assignee hereof, which system comprises various combinations of modular units for providing pressurized heated, cooled and/or dehumidified air for the enclosed compartment of a vehicle. The feature of that invention is the provision of modular components which can be arranged in numerous different arrangements as combined units or remotely located units.

In one arrangement the evaporator module is mounted in the roof of the ROPS cab of a vehicle remote from the condenser. The evaporator module with attached plenum chamber is installed from within the cab where it communicates with the chamber containing filters for incoming ambient and outside air. Since the module must be periodically inspected and serviced, easy and safe access must be provided with a minimum amount of effort and time. Because of the weight of this modular unit, which weighs approximately 120 pounds, means must be provided to raise and lower the module in a relatively confined cab, preferably by one man for such inspection and servicing in a safe manner. It is also desirable that the module be installed and be positively secured in place for protection against possible separation from the cab if the vehicle should roll over.

ASSEMBLY AND OBJECTS OF THE INVENTION

It is the primary object of the present invention to provide mounting means for a modular unit of an air conditioning system that is secure yet provides ready access to the unit for servicing and maintenance.

Another object of the present invention is to provide a pivotal mounting assembly for a modular unit of an air conditioning system for mounting such unit within the cab of a vehicle to permit the unit to be maintained in a secure position for normal operation and to be pivoted to an accessible position for maintenance and service.

In accordance with the primary aspect of the present invention there is provided a mounting assembly for a modular unit of an air conditioning system that is operative to mount the unit within the operator compartment of the vehicle, and a secure mounting therefor for normal operation and to permit the unit to be swung away into a convenient and accessible position for maintenance and service.

BRIEF DESCRIPTION OF THE DRAWINGS

The above and other obvious advantages will become apparent from the following description when read in conjunction with the accompanying drawings wherein:

FIG. 1 is a side elevational view of a vehicle cab having an air conditioning unit mounted therein in accordance with the present invention;

FIG. 2 is a front elevational view of the embodiment of FIG. 1;

FIG. 4 is a side elevational view in section of the present invention showing the conditioning system in an operative position; and FIG. 5 is a side view in section of the system like FIG. 4 showing the air conditioning unit lowered to its service position.

DETAILED DESCRIPTION OF PREFERRED EMBODIMENT

Figure 3:
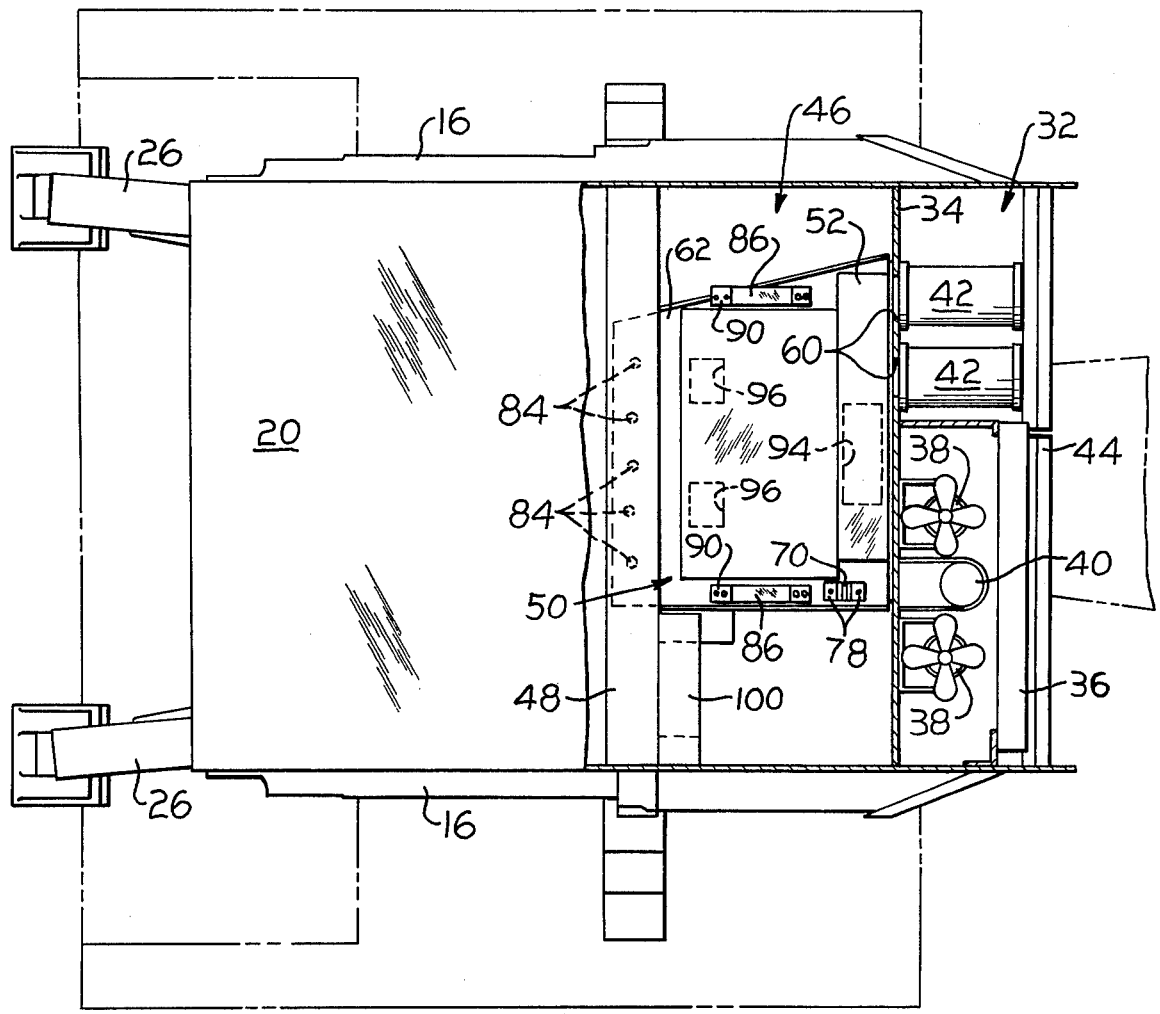
FIG. 3 is a top elevational view of the embodiment of FIG. 1 with portions broken away to reveal details of the invention.

Referring now particularly to FIGS. 1 and 2, there is illustrated a vehicle cab generally designated by the numeral 10 and of the roll-over protective type and generally defining an operator's compartment. The illustrated structure is designed for use on earth-working type vehicles to provide both an enclosed compartment for the operator as well as roll-over protection should the vehicle be overturned. While the cab structure 10 can take any one of a variety of forms, it is customarily constructed to include rear and front walls 12 and 14, and side walls 16, all of which are pivotally formed of sheet metal and include one or more windows for enclosing the operator compartment. The side walls 16 usually include one or more doors 18. The roof 20 extends across the top and covers the top of the structure. The cab 10 is supported above the platform 22 of a vehicle 24 by means of generally vertically extending high-strength posts 26 and 28, which are pivotally secured by resilient securing means generally designated by the numeral 32 in a suitable portion of the operator's platform or to the vehicle structure.

Turning now to FIGS. 3 through 5, the roof of the cab is separated or divided into areas which may be termed compartments and in which is mounted at least a portion of the modular units of an air conditioning system. A forward compartment 32 is formed by a generally L-shaped, laterally extending member 34 in which is mounted a condenser coil 36, a pair of fan motors 38, a dryer 40, and a pair of air filters 42. A generally vertical extending grill member 44 covers the forward portion of the compartment. The fans 38 are operative to draw air across the condenser 36 for cooling purposes and exhaust the air through the grill-covered openings 45 in the roof of the cab.

The second compartment 46 generally formed by a member 34 and a laterally extending support means 48 extending between posts 28, contains an evaporator module generally indicated at 50 and an attached plenum chamber 52. The module 50 contains a heater coil 54, an evaporator coil 56, and a pair of blower fans 58 which are operative to draw air through the coils 54 and 56 and expel it into the operator compartment. This module, of course, as pointed out in the above-mentioned application, may contain only a heater coil or an evaporator coil or in the alternative may contain neither. In the latter case, the unit would constitute merely a fan assembly for pressurizing and circulating air into the operator compartment.

The plenum chamber 52 is secured to the front of the module 50 and receives ambient outside air through a pair of openings or holes 60 in member 54 by way of filters 42. The heater coil 54 will preferably be connected for the circulation of the engine coolant therethrough for supplying heat for heating the interior of the operator compartment. The evaporator coil 56 will be connected in the usual manner in a refrigerant circuit for cooling air circulated therethrough.

The mounting assembly for the evaporator module comprises a mounting plate or member 62, to which the evaporator module 50 is secured in any suitable manner, such as by a plurality of bolts not shown. The mounting plate or bracket 62 is pivotally mounted to a member 34 which is stationary and secured in a suitable manner to the roof of the operator compartment inside thereof. The plate 62 is pivotally secured to the stationary member 34 by suitable means 64 for pivotal movement about its horizontal axis.

Suitable jack means of the screw type is operatively connected at one end to the plate member 62 and at the other end to the roof or other stationary structure of the vehicle to provide suitable means for pivoting or swinging the module 50 about its pivot point into a first or normal operating position as shown in FIG. 4, or into a second position as shown in FIG. 5 for purposes of maintenance or repair.

The jack means generally comprises a screw member such as a threaded shaft 66 having a hex-shaped head 68 and engages a nut member in the form of a threaded tubular member 70 pivotally attached by a suitable trunnion means, as indicated, to the roof of the cab. The trunnion mounting means comprises generally a cross rod 72 secured such as by welding to the upper end of the tube 70 and pivotally engaging spaced bearing portions formed in plate 74, which is secured in a suitable manner by bolts 76 and bosses 78 to the roof 20 of the vehicle cab structure. The screw member 66 extends through an elongated hole in the mounting bracket 62 with a spherical shaped bearing member formed therein and loosely fitted on the shaft adjacent head 68 which is engaged with a socket 82 formed in the plate or bracket 62. The end of the mounting plate or bracket 62 opposite hinge 64 is secured in its operating position as shown in FIG. 4 to beam 48 in a suitable manner, such as by a plurality of bolts 84.

A pair of safety braces 86 are located adjacent each side of the mounting plate or bracket 62 and are secured to the roof by bolts 88 and a boss 90, and to the bracket 62 by bolts 92 which engage nuts 94 which are preferably secured such as by welding to the braces 86. This brace arrangement provides additional security to ensure that the modular unit 50 will not be dislodged from its mounting if the vehicle should roll over.

The modular unit 50 is installed for normal operation in a manner such as shown in FIG. 4. When it becomes necessary or desirable to gain access to the unit for maintenance or repair, the five bolts 84 and four bolts 92 attached to the safety braces 86 are removed, whereupon threaded shaft 66 is rotated to permit pivoting of the mounting plate or bracket 62 about hinge means 64. Continued rotation of the screw member 66 permits lowering of the unit to the position as shown in FIG. 5 for the purposes of maintenance or repair.

In a typical arrangement as shown, the unit 50 weighs approximately 115 to 120 pounds and would require an effort of approximately 65 to 75 pounds to pivotally raise the unit and its mounting bracket for installation of the bolts 84 and 92 as shown in FIG. 4. With the invention as shown, however, the mounting bracket and its attached modular unit can be readily raised to the position shown in FIG. 4, or lowered to the position as shown in FIG. 5 in a quick and safe manner by an individual.

In the illustrated arrangement, recirculated air from inside the vehicle compartment enters the plenum chamber 52 by way of an elongated opening 94 in the mounting bracket 62. Air from the modular unit enters a plenum 96 attached to the bottom surface of the plate 62 where it enters the cab or operator compartment by way of diffusers 98. Air may also be directed such as by means of a conduit 100 to the bottom area of the cab. The conduit 100 is is mounted adjacent the right support post 28.

From the above description it is seen that there is provided a novel mounting arrangement for a modular unit of an air conditioning system whereby the unit of the air conditioning system may be mounted conveniently inside the vehicle cab and may be readily accessible for servicing and maintenance without removal therefrom. The mounting assembly includes a pivotal bracket for supporting the modular unit as well as means for pivoting the unit about the bracket pivot means to its normal operating position or to a position for servicing and maintenance.

While the present invention has been described with respect to a single illustrated embodiment, it is to be understood that numerous changes and modifications may be made therein without departing from the spirit and scope of the invention as defined in the appended claims.

I claim:

1. A pivotal mounting assembly for mounting an air conditioner unit in the operator compartment of a vehicle for supporting said unit in a first position for normal use and swinging said unit to a second position for servicing, comprising in combination:
   an enclosed vehicle operator compartment having a generally horizontally extending roof and a plurality of downwardly depending side walls;
   a stationary mounting member secured to said compartment;
   a pivotal mounting member pivotally secured to said stationary member and supporting an air conditioning unit mounted thereon;
   extensible jack means pivotally secured at one end to said operator compartment and pivotally secured at the other end to said pivotal mounting member, said jack being operative to move said air conditioner unit between said first and said second positions; and
   means for securing said pivotal bracket and said air conditioning unit in said first position.

2. The mounting assembly of claim 1 wherein said stationary mounting member is mounted inside the operator compartment just beneath the roof; and
   said pivotal mounting member is pivoted about a horizontal axis so that said air conditioner unit is against said roof in said first position, and is swung downward away from said roof in said second position.

3. The mounting assembly of claim 2 wherein said jack means is a screw jack having a screw member connected by spherical joint means to said pivotal mounting member, and having a nut member pivotally mounted by trunnion means to the roof of said operator compartment.

4. The combination of claim 2 wherein said unit comprises housing means enclosing an evaporator coil and a blower for circulating air through said coil in said housing.

5. The combination of claim 4 wherein said stationary mounting member comprises a first, generally L-shaped member extending generally laterally across the underside of said roof for defining a forward compartment;

a second member extending laterally across the underside of said roof spaced from said first member and defining a rearward compartment therebetween; and said housing means is supported between first and second members.

6. The combination of claim 5 wherein said jack means is a screw jack pivotally connected at one end to said pivotal mounting member and pivotally connected at the other end to said roof.

7. The combination of claim 6 including a screw member connected to said pivotal mounting member; and a nut member connected to said roof.

8. The combination of claim 7 including a pair of members, one on each side of said unit connected between said roof and said pivotal support member when said air conditioning unit is in said first position.

* * * * *